(12) United States Patent
Chen

(10) Patent No.: US 12,451,799 B2
(45) Date of Patent: Oct. 21, 2025

(54) POWER CONVERTER HAVING OVERVOLTAGE PROTECTION MECHANISM

(71) Applicant: ANPEC ELECTRONICS CORPORATION, Hsinchu (TW)

(72) Inventor: Chih-Ning Chen, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 365 days.

(21) Appl. No.: 18/297,649

(22) Filed: Apr. 10, 2023

(65) Prior Publication Data
US 2024/0195287 A1    Jun. 13, 2024

(30) Foreign Application Priority Data
Dec. 12, 2022   (TW) ................... 111147544

(51) Int. Cl.
*H02M 1/32*    (2007.01)
*H02M 1/00*    (2006.01)
*H02M 1/08*    (2006.01)

(52) U.S. Cl.
CPC ........... *H02M 1/32* (2013.01); *H02M 1/0009* (2021.05); *H02M 1/083* (2013.01)

(58) Field of Classification Search
CPC ...... H02M 1/32; H02M 1/0009; H02M 1/083; H02M 1/088; H02M 3/158; H02H 7/1213
See application file for complete search history.

(56) References Cited

U.S. PATENT DOCUMENTS

| | | | |
|---|---|---|---|
| 6,046,896 A * | 4/2000 | Saeki ................. | H02M 3/1588 323/284 |
| 9,024,604 B2 | 5/2015 | Oki | |
| 2006/0164053 A1* | 7/2006 | Walter ................... | G05F 1/575 323/282 |
| 2010/0013451 A1* | 1/2010 | Nakamura .......... | H02M 3/1588 323/282 |
| 2011/0291632 A1* | 12/2011 | Yu ......................... | H02M 3/158 323/283 |
| 2021/0044199 A1* | 2/2021 | Kim ....................... | H02M 1/32 |
| 2022/0094267 A1* | 3/2022 | Searles ................ | H02M 1/32 |
| 2022/0255435 A1 | 8/2022 | Yoon et al. | |

FOREIGN PATENT DOCUMENTS

CN      216086500 U    3/2022
WO    WO2013005529 A1    1/2013

* cited by examiner

*Primary Examiner* — Monica Lewis
*Assistant Examiner* — Jye-June Lee
(74) *Attorney, Agent, or Firm* — Li & Cai Intellectual Property Office

(57) ABSTRACT

A power converter having an overvoltage protection mechanism is provided. A node between a second terminal of the high-side switch and a first terminal of a low-side switch is connected to an inductor. When an output current or an output voltage of the power converter must be released, the output current of the power converter flows to the input power source sequentially through the inductor, the high-side switch being turned on. Under this condition, when an overvoltage protecting circuit determines that a current or a voltage of the inductor or a current or a voltage of the input power source is larger than a threshold, the output current of the power converter flows to a ground through the overvoltage protecting circuit.

14 Claims, 6 Drawing Sheets

POWER CONVERTER HAVING OVERVOLTAGE PROTECTION MECHANISM

CROSS-REFERENCE TO RELATED PATENT APPLICATION

This application claims the benefit of priority to Taiwan Patent Application No. 111147544, filed on Dec. 12, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power converter having an overvoltage protection mechanism.

BACKGROUND OF THE DISCLOSURE

Power converters are used for converting voltages and supplying the converted voltage to electronic devices connected to the power converters as power for operation of the electronic devices. However, when the power converters output excessive voltages or currents, energy of the power converters must be released to prevent circuit components at output terminals of the power converters from being damaged by the excessive voltages or currents. However, if the excessive currents are released along inappropriate current paths, the circuit components of the power converters and input power sources may be damaged by the excessive currents.

SUMMARY OF THE DISCLOSURE

In response to the above-referenced technical inadequacies, the present disclosure provides a power converter having an overvoltage protection mechanism. The power converter includes a switch circuit, a driver circuit, a control circuit and an overvoltage protecting circuit. The switch circuit includes a high-side switch and a low-side switch. A first terminal of the high-side switch is connected to an input power source. A first terminal of the low-side switch is connected to a second terminal of the high-side switch. A second terminal of the low-side switch is grounded. A node between the second terminal of the high-side switch and the first terminal of the low-side switch is connected to a first terminal of an inductor. A second terminal of the inductor is connected to a first terminal of an output capacitor. A second terminal of the output capacitor is grounded. The driver circuit is connected to a control terminal of the high-side switch, a control terminal of the low-side switch and the input power source. The control circuit is connected to the driver circuit and the input power source. The overvoltage protecting circuit is connected to the input power source and the first terminal of an inductor. When energy at an output node between the second terminal of the inductor and the first terminal of an output capacitor must be released, the control circuit controls the driver circuit to turn on the high-side switch, and an output current of the power converter flows from the output node sequentially through the inductor and the high-side switch to the input power source. When the overvoltage protecting circuit determines that a voltage or a current at the first terminal of the inductor or a voltage or a current of the input power source is larger than a threshold, a part of the output current of the power converter flows from the output node sequentially through the inductor and the high-side switch to the input power source, and other parts of the output current of the power converter flows from the output node through the overvoltage protecting circuit to a ground.

In certain embodiments, when the energy at the output node between the second terminal of the inductor and the first terminal of the output capacitor must be released, the driver circuit turns on the high-side switch such that the output current of the power converter flows from the output node sequentially through the inductor and the low-side switch to the ground.

In certain embodiments, the overvoltage protecting circuit includes an error amplifier and a switch component. A first input terminal of the error amplifier is coupled to a reference voltage. A second input terminal of the error amplifier is connected to the input power source. An output terminal of the error amplifier is connected to a control terminal of the switch component. A first terminal of the switch component is connected to the first terminal of the inductor. A second terminal of the switch component is grounded.

In certain embodiments, the overvoltage protecting circuit further includes a buffer. A first input terminal of the buffer is connected to the output terminal of the error amplifier. A second input terminal of the buffer is connected to an output terminal of the buffer and the control terminal of the switch component.

In certain embodiments, the overvoltage protecting circuit further includes a voltage divider circuit. An input terminal of the voltage divider circuit is connected to the input power source. An output terminal of the voltage divider circuit is connected to the second input terminal of the error amplifier.

In certain embodiments, the voltage divider circuit includes a first voltage-dividing resistor and a second voltage-dividing resistor. A first terminal of the first voltage-dividing resistor is connected to the input power source. A second terminal of the first voltage-dividing resistor is connected to a first terminal of the second voltage-dividing resistor. A node between the second terminal of the first voltage-dividing resistor and the first terminal of the second voltage-dividing resistor is connected to the second input terminal of the error amplifier. A second terminal of the second voltage-dividing resistor is grounded.

In certain embodiments, the overvoltage protecting circuit further includes a resistor and a capacitor. A first terminal of the resistor is connected to the output terminal of the error amplifier. A second terminal of the resistor is connected to the first terminal of the capacitor. The second terminal of the capacitor is grounded.

In certain embodiments, the overvoltage protecting circuit further includes a first transistor and a second transistor. A first terminal of the second transistor is connected to the input power source. A second terminal of the second transistor is grounded. A control terminal of the second transistor is connected to a control terminal of the first transistor. A first terminal of the first transistor is connected to the first terminal of the inductor. A second terminal of the first transistor is grounded.

In certain embodiments, the overvoltage protecting circuit further includes a resistor. The resistor is connected between the second terminal of the second transistor and the ground. The second terminal of the second transistor is connected to a first terminal of the resistor. A second terminal of the resistor is grounded.

In certain embodiments, the overvoltage protecting circuit further includes a first transistor and a plurality of second transistors. A first terminal of one of the plurality of second transistors is connected to the input power source. A second terminal and a control terminal of the one of the plurality of second transistors are connected to a control terminal of the first transistor. A second terminal of another of the plurality of second transistors is grounded. A first terminal of the other of the plurality of second transistors is connected to a second terminal of the second transistor disposed adjacent thereto. The control terminal and the second terminal of each of the plurality of second transistors are connected to each other.

In certain embodiments, the overvoltage protecting circuit further includes a resistor. The resistor is connected between the second terminal of the another of the plurality of second transistors and the ground. The second terminal of the another of the plurality of second transistors is connected to a first terminal of the resistor. A second terminal of the resistor is grounded.

In certain embodiments, the overvoltage protecting circuit includes an error amplifier and a switch component. A first input terminal of the error amplifier is coupled to the first terminal of the inductor. A second input terminal of the error amplifier is coupled to a reference voltage. An output terminal of the error amplifier is connected to a control terminal of the switch component. A first terminal of the switch component is connected to the input power source. A second terminal of the switch component is grounded.

In certain embodiments, the overvoltage protecting circuit further includes a buffer. A first input terminal of the buffer is connected to the output terminal of the error amplifier. A second input terminal of the buffer is connected to an output terminal of the buffer and the control terminal of the switch component.

In certain embodiments, the overvoltage protecting circuit further includes a voltage divider circuit. An input terminal of the voltage divider circuit is connected to the first terminal of the inductor. An output terminal of the voltage divider circuit is connected to the first input terminal of the error amplifier.

In certain embodiments, the voltage divider circuit includes a first voltage-dividing resistor and a second voltage-dividing resistor. A first terminal of the first voltage-dividing resistor is connected to the first terminal of the inductor. A second terminal of the first voltage-dividing resistor is connected to a first terminal of the second voltage-dividing resistor. The first terminal of the second voltage-dividing resistor is connected to the first input terminal of the error amplifier. A second terminal of the second voltage-dividing resistor is grounded.

In certain embodiments, the overvoltage protecting circuit further includes a resistor and a capacitor. A first terminal of the resistor is connected to the output terminal of the error amplifier. A second terminal of the resistor is connected to the first terminal of the capacitor. The second terminal of the capacitor is grounded.

In certain embodiments, the power converter further includes a comparator. A first input terminal of the comparator is coupled to a reference voltage. A second input terminal of the comparator is connected to the second terminal of the inductor. An output terminal of the comparator is connected to an input terminal of the control circuit.

In certain embodiments, the power converter further includes a voltage divider circuit. An input terminal of the voltage divider circuit is connected to the second terminal of the inductor. An output terminal of the voltage divider circuit is connected to the second input terminal of the comparator.

In certain embodiments, the voltage divider circuit includes a first voltage-dividing resistor and a second voltage-dividing resistor. A first terminal of the first voltage-dividing resistor is connected to the second terminal of the inductor. A second terminal of the first voltage-dividing resistor is connected to a first terminal of the second voltage-dividing resistor. A node between the second terminal of the first voltage-dividing resistor and the first terminal of the second voltage-dividing resistor is connected to the second input terminal of the comparator. A second terminal of the second voltage-dividing resistor is grounded.

In certain embodiments, the power converter further includes a zero-crossing detector circuit. The zero-crossing detector circuit is connected to the output terminal of the comparator and the driver circuit. The zero-crossing detector circuit detects a comparison signal outputted by the comparator to determine a time point at which the output current of the power converter reaches a zero value to output a zero-crossing signal. The driver circuit drives the high-side switch and the low-side switch according to the zero-crossing signal.

As described above, the present disclosure provides the power converter having the overvoltage protection mechanism. When the energy at the output terminal of the power converter of the present disclosure is too high, the output current of the power converter of the present disclosure flows sequentially through the inductor and the high-side switch being turned on to the input power source connected to an input terminal of the power converter. At this time, if the output current of the power converter, the voltage of any one of the circuit components of the power converter or the current flowing through any one of the circuit components is larger than the threshold, the partial output current of the power converter of the present disclosure is released to the ground through the overvoltage protecting circuit of the power converter of the present disclosure. If necessary, the output current of the power converter of the present disclosure may flow sequentially through the inductor and the low-side switch to the ground. Therefore, the circuit components at the output terminal of the power converter of the present disclosure, the circuit components through which the released output current of the power converter flows and the input power source connected to the input terminal of the power converter can be prevented from being damaged by an excessive voltage or an excessive current from the power converter of the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

Figure 1:
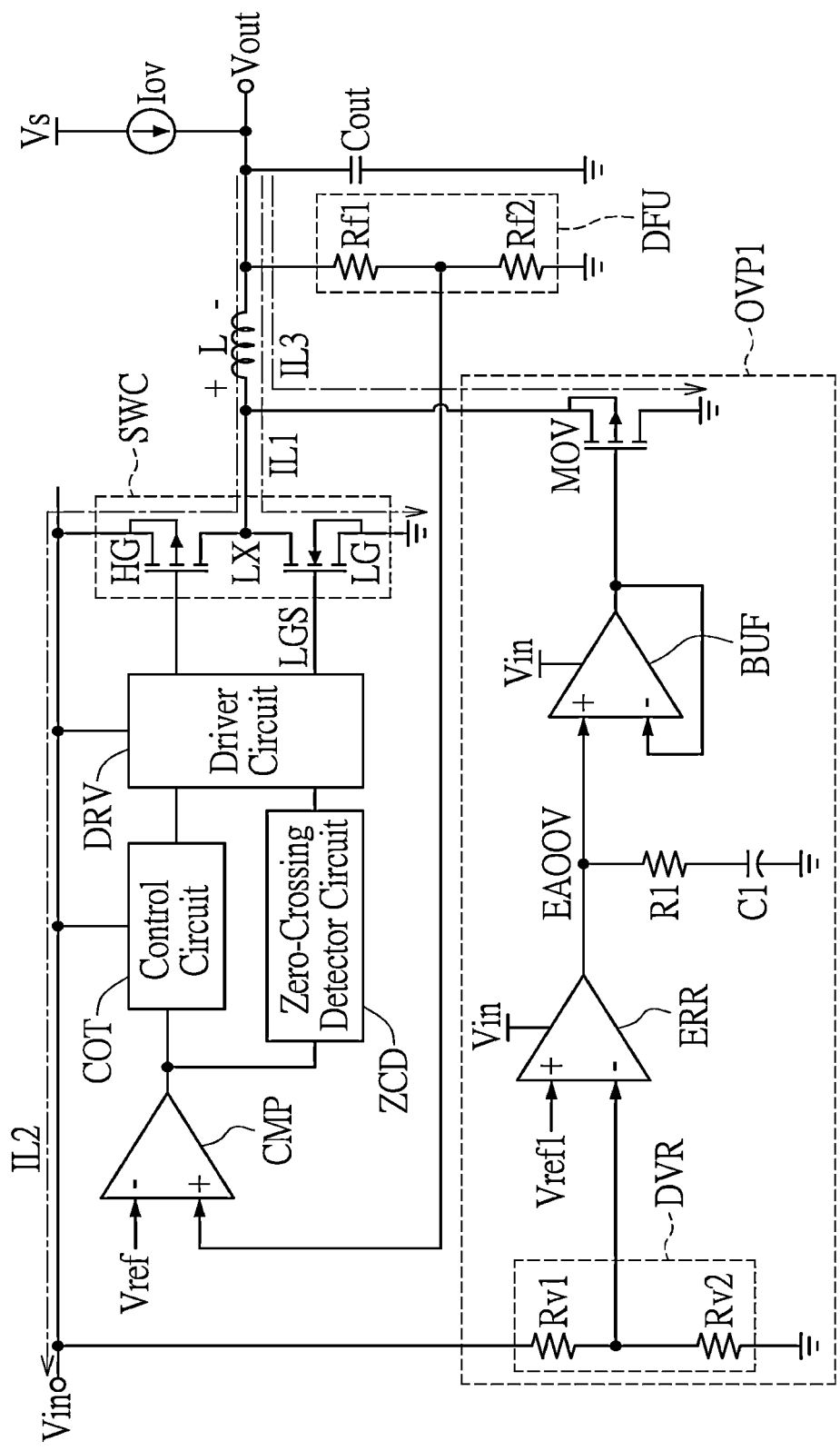
FIG. 1 is a circuit diagram of a power converter having an overvoltage protection mechanism according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit diagram of a power converter having an overvoltage protection mechanism according to a first embodiment of the present disclosure.

As shown in FIG. 1, the power converter of the first embodiment of the present disclosure includes a switch circuit SWC, a driver circuit DRV and a control circuit COT. In particular, the power converter of the first embodiment of the present disclosure further includes an overvoltage protecting circuit OVP1. If necessary, as shown in FIG. 1, the power converter of the present disclosure may include a comparator CMP, a zero-crossing detector circuit ZCD or a combination thereof.

The switch circuit SWC may include a high-side switch HG and a low-side switch LG. A first terminal of the high-side switch HG is connected to an input power source Vin. A first terminal of the low-side switch LG is connected to a second terminal of the high-side switch HG. A second terminal of the low-side switch LG is grounded. A node LX between the second terminal of the high-side switch HG and the first terminal of the low-side switch LG is connected to a first terminal of an inductor L. A second terminal of the inductor L is connected to a first terminal of an output capacitor Cout. A second terminal of the output capacitor Cout is grounded. An output node between the second terminal of the inductor L and the first terminal of the output capacitor Cout is an output terminal of the power converter. A voltage of the output terminal of the power converter is an output voltage Vout as shown in FIG. 1.

A power input terminal of the driver circuit DRV and a power input terminal of the control circuit COT are connected to the input power source Vin. An output terminal of the driver circuit DRV is connected to a control terminal of the high-side switch HG and a control terminal of the low-side switch LG. An output terminal of the control circuit COT is connected to an input terminal of the driver circuit DRV. The control circuit COT controls the driver circuit DRV to drive the high-side switch HG and the low-side switch LG.

A first input terminal such as an inverting input terminal of the comparator CMP is coupled to a reference voltage Vref. A second input terminal such as a non-inverting input terminal of the comparator CMP may be directly connected to the second terminal of the inductor L, or may be connected to the second terminal of the inductor L through a voltage divider circuit DFU as shown in FIG. 1.

As shown in FIG. 1, the second input terminal such as the non-inverting input terminal of the comparator CMP may be connected to an output terminal of the voltage divider circuit DFU, and an input terminal of the voltage divider circuit DFU is connected to the second terminal of the inductor L.

For example, the voltage divider circuit DFU may include a first voltage-dividing resistor Rf1 and a second voltage-dividing resistor Rf2. A first terminal of the first voltage-dividing resistor Rf1 is connected to the output node between the second terminal of the inductor L and the first terminal of the output capacitor Cout. A second terminal of the first voltage-dividing resistor Rf1 is connected to a first terminal of the second voltage-dividing resistor Rf2. A second terminal of the second voltage-dividing resistor Rf2 is grounded. A node between the second terminal of the first voltage-dividing resistor Rf1 and the first terminal of the second voltage-dividing resistor Rf2 is connected to the second input terminal such as the non-inverting input terminal of the comparator CMP.

The voltage divider circuit DFU may divide the output voltage Vout to generate a divided voltage that is a voltage of the first terminal of the second voltage-dividing resistor Rf2.

An output terminal of the comparator CMP is connected to an input terminal of the control circuit COT and an input terminal of the zero-crossing detector circuit ZCD. The output terminal of the control circuit COT and an output terminal of the zero-crossing detector circuit ZCD are connected to the input terminal of the driver circuit DRV.

The comparator CMP may compare the output voltage Vout or the divided voltage of the output voltage Vout with the reference voltage Vref to output a comparison signal.

The control circuit COT may output a control signal according to the comparison signal from the comparator CMP. The zero-crossing detector circuit ZCD may, according to the comparison signal from the comparator CMP, determine a time point at which an output current (that is a current flowing from the output node between the second terminal of the inductor L and the first terminal of the output capacitor Cout) or other currents of the power converter reaches a zero value to output a zero-crossing signal.

The driver circuit DRV may drive the high-side switch HG and the low-side switch LG, according to the control signal from the control circuit COT and the zero-crossing signal from the zero-crossing detector circuit ZCD.

It is worth noting that, excessive energy, such as the excessive output voltage Vout or an excessive current, may be generated at the output terminal of the power converter of the present disclosure (that is the output node between the second terminal of the inductor L and the first terminal of the output capacitor Cout), due to an excessive current supplied by an external current source Iov or other factors. Under this condition, the excessive energy of the power converter of the present disclosure must be released.

The energy of the power converter of the present disclosure may be released along a first current releasing path and a third current releasing path, and in particular, along a second current releasing path.

When the control circuit COT controls the driver circuit DRV to turn on the low-side switch LG, the energy at the output terminal of the power converter of the present disclosure may be released along the first current releasing path. In the first current releasing path, an output current IL1 of the power converter flows from the output node sequentially through the inductor L and the low-side switch LG being turned on to a ground. That is, the output current IL1 of the power converter is released to the ground along the first current releasing path.

After (or before) the energy at the output terminal of the power converter of the present disclosure is released along the first current releasing path, the control circuit COT controls the driver circuit DRV to turn on the high-side switch HG and to turn off the low-side switch LG. At this time, the energy at the output terminal of the power converter of the present disclosure is released along the second current releasing path. In the second current releasing path, an output current IL2 flows from the output terminal of the power converter sequentially through the inductor L, the high-side switch HG being turned on to the input power source Vin.

When the output current IL2 of the power converter flows sequentially through the inductor L, the high-side switch HG being turned on to the input power source Vin, the overvoltage protecting circuit OVP1 of the present disclosure detects parameters of the circuit components of the power converter through which the output current IL2 flows. The overvoltage protecting circuit OVP1, according to the detected parameters, determines whether or not to perform an overvoltage protection operation for the input power source Vin to prevent a voltage or current of the input power source Vin from being increased to an excessive value.

As shown in FIG. 1, in the embodiment, the overvoltage protecting circuit OVP1 is connected to the input power source Vin and the first terminal of the inductor L. The overvoltage protecting circuit OVP1 may detect the voltage of the input power source Vin, or detect the output current IL2 that flows from the power converter to the input power source Vin.

It is worth noting that, when the overvoltage protecting circuit OVP1 determines that the output current IL2 that flows from the power converter to the input power source Vin or the voltage of the input power source Vin is larger than a threshold, the overvoltage protecting circuit OVP1 allows the energy at the output terminal of the power converter of the present disclosure to be released along the second current releasing path and the third current releasing path at the same time.

In the third current releasing path, an output current IL3 flows from the output terminal of the power converter of the present disclosure through the overvoltage protecting circuit OVP1 to the ground. At the same time, in the second current releasing path, the output current IL2 of the power converter of the present disclosure flows from the output node sequentially through the inductor L, the high-side switch HG being turned on to the input power source Vin.

For example, the overvoltage protecting circuit OVP1 may include an error amplifier ERR and a switch component MOV as shown in FIG. 1. If necessary, the overvoltage protecting circuit OVP1 may further include a buffer BUF, a voltage divider circuit DVR, a resistor R1, a capacitor C1, or any combination thereof.

A power input terminal of the error amplifier ERR may be connected to the input power source Vin. A first input terminal such as a non-inverting input terminal of the error amplifier ERR may be coupled to a reference voltage Vref1.

A second input terminal such as an inverting input terminal of the error amplifier ERR may be directly connected to the input power source Vin, or may be connected to the input power source Vin through the voltage divider circuit DVR as shown in FIG. 1. As shown in FIG. 1, the second input terminal such as the inverting input terminal of the error amplifier ERR may be connected to an output terminal of the voltage divider circuit DVR, and an input terminal of the voltage divider circuit DVR may be connected to the input power source Vin.

For example, as shown in FIG. 1, the voltage divider circuit DVR may include a first voltage-dividing resistor Rv1 and a second voltage-dividing resistor Rv2. A first terminal of the first voltage-dividing resistor Rv1 is connected to the input power source Vin. A second terminal of the first voltage-dividing resistor Rv1 is connected to a first terminal of the second voltage-dividing resistor Rv2. A second terminal of the second voltage-dividing resistor Rv2 is grounded. A node between the second terminal of the first voltage-dividing resistor Rv1 and the first terminal of the second voltage-dividing resistor Rv2 is connected to the second input terminal such as the inverting input terminal of the error amplifier ERR.

An output terminal of the error amplifier ERR may be directly connected to a control terminal of the switch component MOV, or may be connected to the control terminal of the switch component MOV through the buffer BUF as shown in FIG. 1.

As shown in FIG. 1, a power input terminal of the buffer BUF may be connected to the input power source Vin. A first input terminal such as a non-inverting input terminal of the buffer BUF may be connected to the output terminal of the error amplifier ERR. A second terminal such as an inverting input terminal of the buffer BUF may be connected to an output terminal of the buffer BUF and the control terminal of the switch component MOV.

A first terminal of the switch component MOV may be connected to the first terminal of the inductor L. A second terminal of the switch component MOV may be grounded. The switch component MOV may be a transistor. For example, as shown in FIG. 1, in the first embodiment, the switch component MOV is a P-type metal-oxide-semiconductor (PMOS) transistor, but the present disclosure is not limited thereto.

If necessary, the output terminal of the error amplifier ERR and the first input terminal such as the non-inverting input terminal of the buffer BUF may be connected to a first terminal of the resistor R1. A second terminal of the resistor R1 may be connected to a first terminal of the capacitor C1. A second terminal of the capacitor C1 may be grounded.

The error amplifier ERR may multiply a difference between the voltage of the input power source Vin (that is a voltage of the first terminal of the second voltage-dividing resistor Rv2) and the reference voltage Vref1 by a gain to generate an error amplified signal EAOOV. Alternatively, as shown in FIG. 1, the voltage divider circuit DVR divides the voltage of the input power source Vin to generate a divided voltage, and the error amplifier ERR may multiply a difference between the divided voltage of the voltage of the input power source Vin and the reference voltage Vref1 by a gain to generate the error amplified signal EAOOV.

The error amplifier ERR may output the error amplified signal EAOOV to the resistor R1 and the capacitor C1. Alternatively, the error amplifier ERR may directly output the error amplified signal EAOOV to the first input terminal such as the non-inverting input terminal of the buffer BUF. If the buffer BUF, the resistor R1 and the capacitor C1 are not disposed in the power converter, the error amplifier ERR may directly output the error amplified signal EAOOV to the control terminal of the switch component MOV.

When the energy at the output terminal of the power converter of the present disclosure is released, the high-side switch HG of the power converter is turned on. At this time, the output current IL2 flows from the output terminal of the power converter sequentially through the inductor L, and the high-side switch HG being turned on to the input power source Vin.

When the output current IL2 flows from the output terminal of the power converter sequentially through the inductor L, the high-side switch HG being turned on to the input power source Vin, the error amplifier ERR of the overvoltage protecting circuit OVP1 multiplies the difference between the voltage of the input power source Vin (that is the voltage of the first terminal of the second voltage-dividing resistor Rv2) or the divided voltage thereof and the reference voltage Vref1 by the gain to generate the error amplified signal EAOOV to the control terminal of the switch component MOV. When the voltage of the input power source Vin or the divided voltage thereof is too high, the switch component MOV is turned on by the error amplified signal EAOOV to allow the output current IL3 to flow through the switch component MOV to the ground. That is, when the energy at the output terminal of the power converter is released, the output current at the output terminal of the power converter is divided into the output currents IL2 and IL3 that are respectively released to the input power source Vin and the ground at the same time. Therefore, the output current IL2 that flows from the power converter to the input power source Vin is reduced, thereby preventing the voltage of the input power source Vin from being increased to the excessive voltage by the output current of the power converter.

When the switch component MOV of the overvoltage protecting circuit OVP1 is turned on, the output current IL3 flows from the output terminal of the power converter through the switch component MOV to the ground. At the same time, the output current IL2 flows from the output terminal of the power converter through the inductor L and the high-side switch HG to the input power source Vin. As a result, the energy at the output terminal of the power converter is released under the condition that the input power source Vin is not damaged by an excessive current from the power converter.

That is, when the energy at the output terminal of the power converter must be released, the output current of the power converter of the present disclosure is divided into the two released output currents IL2 and IL3.

Figure 2:
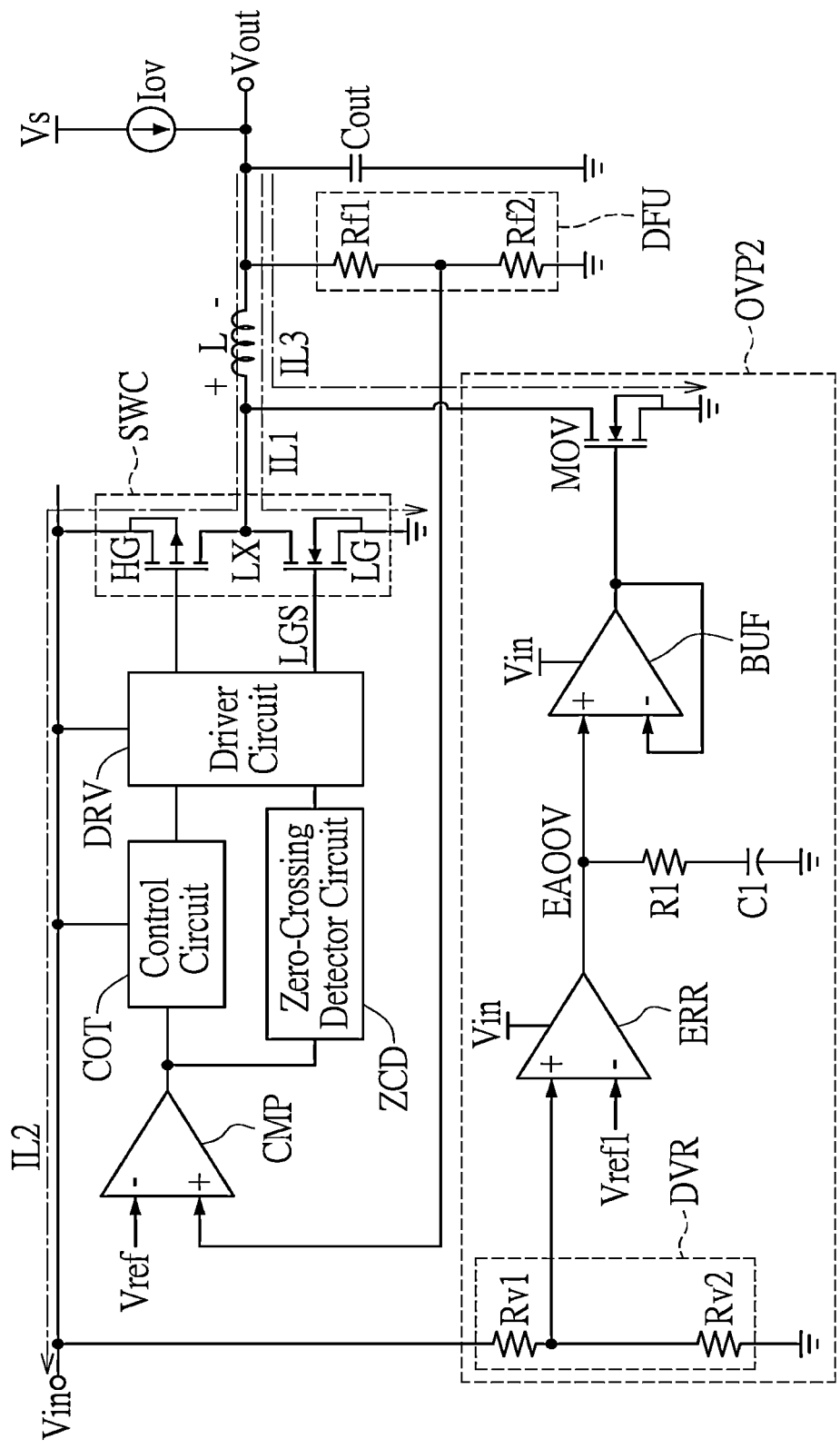
FIG. 2 is a circuit diagram of a power converter having an overvoltage protection mechanism according to a second embodiment of the present disclosure.

Reference is made to FIG. 2, which is a circuit diagram of a power converter having an overvoltage protection mechanism according to a second embodiment of the present disclosure. The same descriptions of the first and second embodiments of the present disclosure are not repeated herein.

A difference between the first and second embodiments of the present disclosure is that, the overvoltage protecting circuit OVP2 of the second embodiment is slightly different from the overvoltage protecting circuit OVP1 of the first embodiment, as described in detail in the following.

In the overvoltage protecting circuit OVP1 of the first embodiment, the first input terminal of the error amplifier ERR that is coupled to the reference voltage Vref1 is the non-inverting input terminal, the second input terminal of the error amplifier ERR that is connected to the input power source Vin (through the voltage divider circuit DVR) is the inverting input terminal, and the switch component MOV is the P-type metal-oxide-semiconductor (PMOS) transistor.

In the overvoltage protecting circuit OVP2 of the second embodiment, the first input terminal of the error amplifier ERR that is coupled to the reference voltage Vref1 is the inverting input terminal, the second input terminal of the error amplifier ERR that is connected to the input power source Vin (through the voltage divider circuit DVR) is the non-inverting input terminal, and the switch component MOV is an N-type metal-oxide-semiconductor (NMOS) transistor.

When the energy at the output terminal of the power converter of the present disclosure is released, the high-side switch HG of the power converter is turned on. At this time, the output current IL2 flows from the output terminal of the power converter sequentially through the inductor L, the high-side switch HG being turned on to the input power source Vin.

When the output current IL2 of the power converter flows to the input power source Vin, the error amplifier ERR of the overvoltage protecting circuit OVP2 multiplies the difference between the voltage of the input power source Vin or the divided voltage thereof and the reference voltage Vref1 by the gain to output the error amplified signal EAOOV to the control terminal of the switch component MOV. When the voltage of the input power source Vin or the divided voltage thereof is too high, the switch component MOV is turned on by the error amplified signal EAOOV to allow the output current IL3 to flow through the switch component MOV to the ground. That is, when the energy at the output terminal of the power converter is released, the output current at the output terminal of the power converter is divided into the output currents IL2 and IL3 that are respectively released to the input power source Vin and the ground at the same time. Therefore, the output current IL2 flowing from the power converter to the input power source Vin is reduced, thereby preventing the voltage of the input power source Vin from being increased to the excessive voltage.

In detail, when the switch component MOV of the overvoltage protecting circuit OVP2 is turned on, the output current IL3 flows from the output terminal of the power converter through the switch component MOV to the ground, and the output current IL2 flows from the output terminal of the power converter sequentially through the inductor L and the high-side switch HG to the input power source Vin, at the same time. As a result, the energy at the output terminal of the power converter is released.

Figure 3:
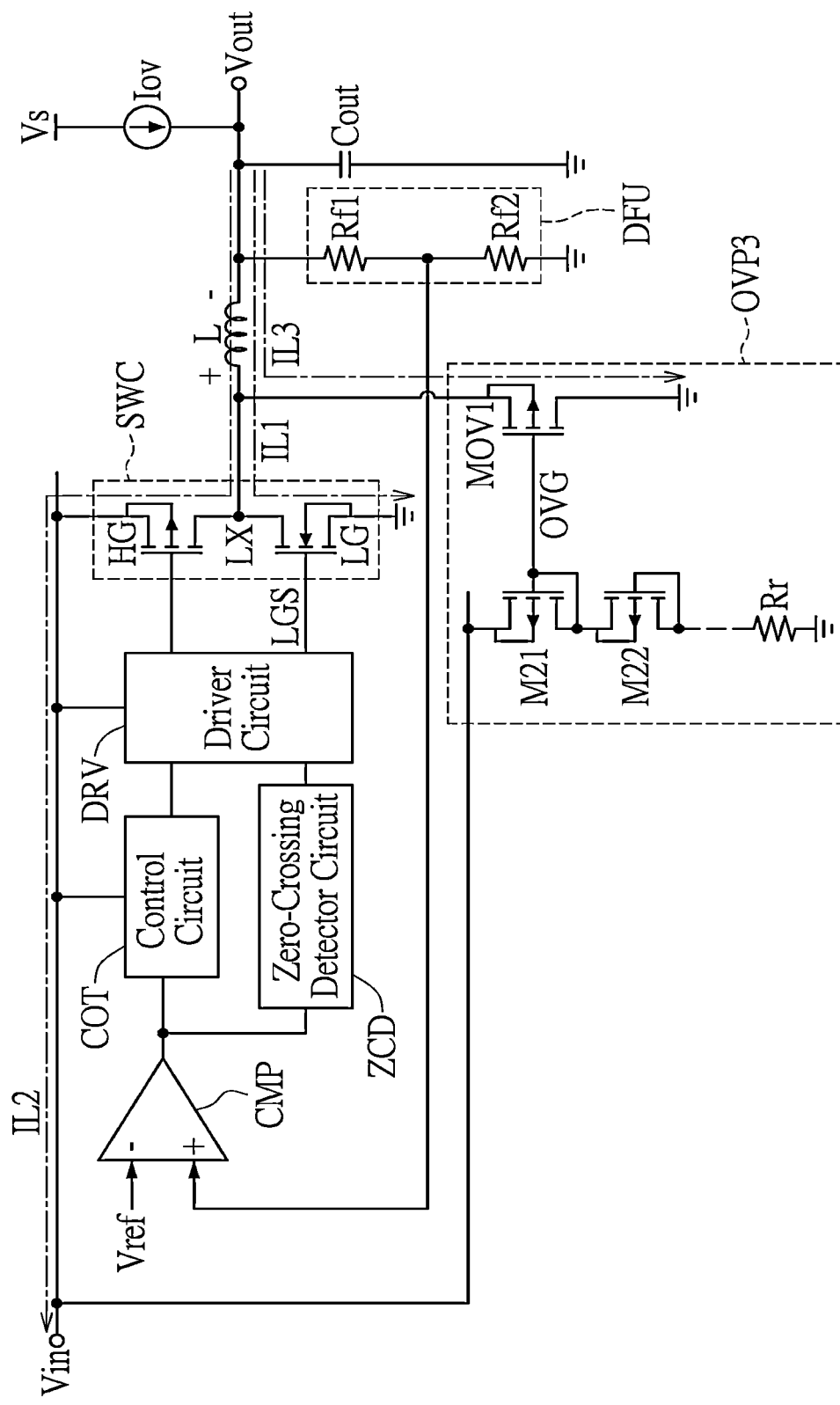
FIG. 3 is a circuit diagram of a power converter having an overvoltage protection mechanism according to a third embodiment of the present disclosure.

Reference is made to FIG. 3, which is a circuit diagram of a power converter having an overvoltage protection mechanism according to a third embodiment of the present disclosure. The same descriptions of the first and third embodiments of the present disclosure are not repeated herein.

A difference between the first and third embodiments of the present disclosure is that, the overvoltage protecting circuit OVP3 of the third embodiment is different from the overvoltage protecting circuit OVP1 of the first embodiment, as described specifically in the following.

In the third embodiment, the overvoltage protecting circuit OVP3 may include N first transistors and M second transistors, wherein N and M are any appropriate integer values. If necessary, the overvoltage protecting circuit OVP3 may further include a resistor Rr.

For example, as shown in FIG. 3, the overvoltage protecting circuit OVP3 includes one (N=1) first transistor MOV1 and two (M=2) second transistors M21 and M22. A first terminal of the second transistors M21 is connected to the input power source Vin. A second terminal of the second transistor M21 is connected to a control terminal of the second transistor M21. A voltage OVG is at the control terminal of the second transistor M21 as shown in FIG. 3. A first terminal of the second transistor M22 is connected to the second terminal of the second transistor M21. A second terminal of the second transistor M22 may be grounded through the resistor Rr as shown in FIG. 3. That is, the first terminal of the second transistor M22 is connected to the first terminal of the resistor Rr, and the second terminal of the resistor Rr is grounded. In practice, the second terminal of the second transistor M22 may be directly grounded. A control terminal of the first transistor MOV1 is connected to the second terminal and the control terminal of the second transistor M21. A first terminal of the first transistor MOV1 is connected to the first terminal of the inductor L. A second terminal of the first transistor MOV1 is grounded.

In practice, the overvoltage protecting circuit OVP3 may only include the first transistor MOV1 and the second transistor M21. The control terminal of the second transistor M21 is connected to the second terminal of the second transistor M21 and the control terminal of the first transistor MOV1. The first terminal of the first transistor MOV1 is connected to the first terminal of the inductor L. The second terminal of the first transistor MOV1 is grounded.

When the energy at the output terminal of the power converter of the present disclosure is released, the high-side switch HG of the power converter is turned on. At this time, the output current IL2 flows from the output terminal of the power converter sequentially through the inductor L, the high-side switch HG being turned on to the input power source Vin.

When the output current IL2 flows from the power converter sequentially through the inductor L and the high-side switch HG to the input power source Vin, the voltage of the input power source Vin may be increased to be higher than a threshold. In the embodiment, the threshold is a sum of voltage differences between voltages of the control terminals (such as gate terminals) of the M second transistors and voltages of the first terminals (such as source terminals) of the M second transistors, for example, which is represented by M×VGS, wherein VGS is the difference between the voltage of the gate terminal of each of the M second transistors and the voltage of the source terminal of each of the M second transistors.

When the voltage of the input power source Vin is higher than the sum of the voltage differences between the voltages of the control terminals (such as the gate terminals) of the M second transistors and the voltages of the first terminals (such as the source terminals) of the M second transistors of the overvoltage protecting circuit OVP3, the output current IL3 flows from the output terminal of the power converter through the first transistor MOV1 of the overvoltage protecting circuit OVP3 to the ground. At the same time, the output current IL2 flows from the output terminal of the power converter through the inductor L and the high-side switch HG to the input power source Vin. As a result, the energy at the output terminal of the power converter is released under the condition that the input power source Vin is not damaged by the excessive current from the power converter.

Figure 4:
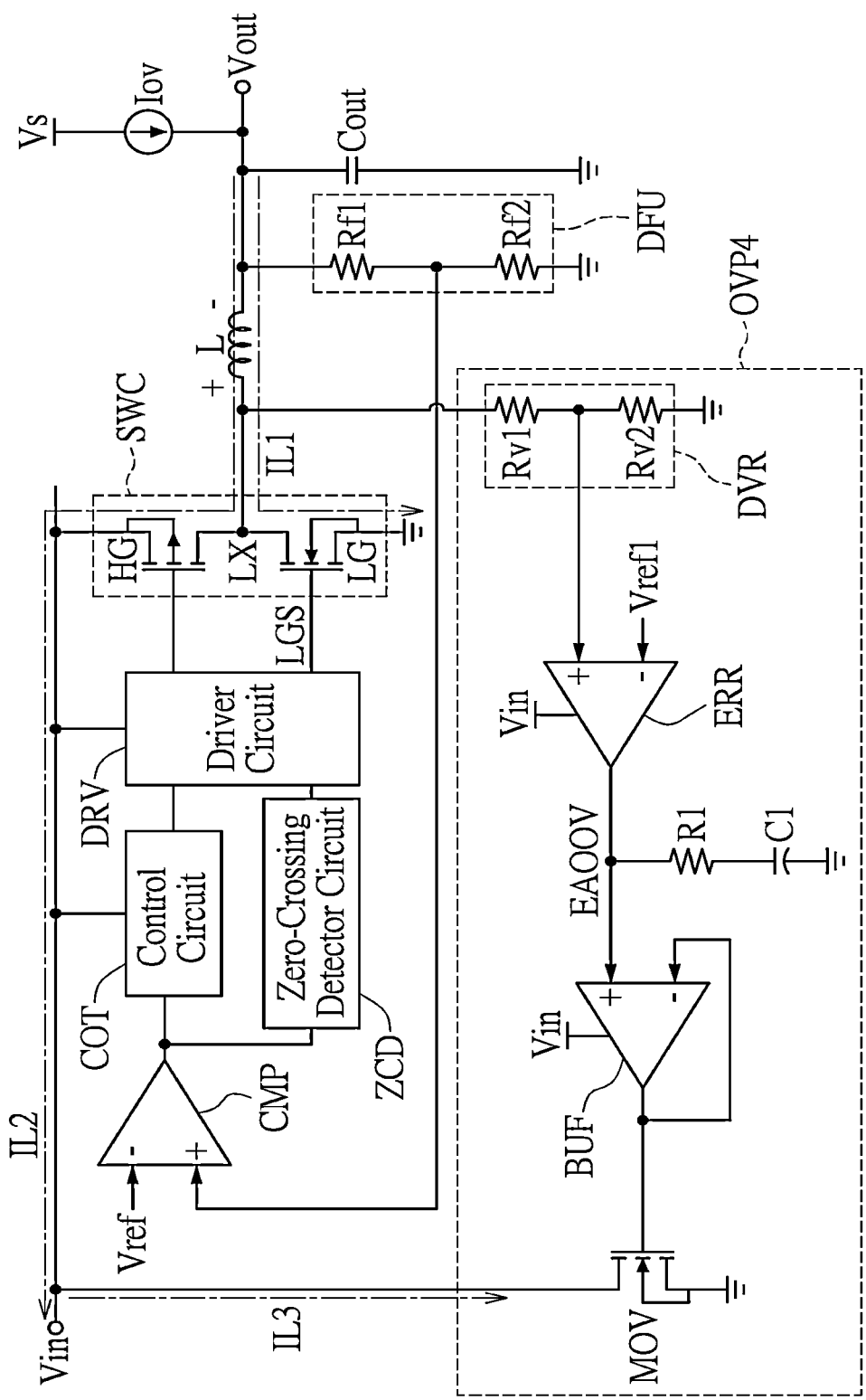
FIG. 4 is a circuit diagram of a power converter having an overvoltage protection mechanism according to a fourth embodiment of the present disclosure.

Reference is made to FIG. 4, which is a circuit diagram of a power converter having an overvoltage protection mechanism according to a fourth embodiment of the present disclosure. The same descriptions of the first and fourth embodiments of the present disclosure are not repeated herein. A difference between the first and fourth embodiments of the present disclosure is that, the overvoltage protecting circuit OVP4 of the fourth embodiment is different from the overvoltage protecting circuit OVP1 of the first embodiment, as described specifically in the following.

As shown in FIG. 4, the second input terminal such as the inverting input terminal of the error amplifier ERR may be coupled to the reference voltage Vref1. The first input terminal such as the non-inverting input terminal of the error amplifier ERR may be connected to the output terminal of the voltage divider circuit DVR, and the input terminal of the voltage divider circuit DVR may be connected to the first terminal of the inductor L.

For example, as shown in FIG. 4, the voltage divider circuit DVR may include the first voltage-dividing resistor Rv1 and the second voltage-dividing resistor Rv2. The first terminal of the first voltage-dividing resistor Rv1 is connected to the first terminal of the inductor L. The second terminal of the first voltage-dividing resistor Rv1 is connected to the first terminal of the second voltage-dividing resistor Rv2. The second terminal of the second voltage-dividing resistor Rv2 is grounded. The node between the second terminal of the first voltage-dividing resistor Rv1 and the first terminal of the second voltage-dividing resistor Rv2 is connected to the first input terminal such as the non-inverting input terminal of the error amplifier ERR.

The output terminal of the error amplifier ERR is connected to the first input terminal such as the non-inverting input terminal of the buffer BUF. The second input terminal such as the inverting input terminal of the buffer BUF is connected to the output terminal of the buffer BUF and the control terminal of the switch component MOV. The first terminal of the switch component MOV is connected to the input power source Vin. The second terminal of the switch component MOV is grounded.

The error amplifier ERR multiplies a difference between a voltage of the first terminal of the inductor L (or a divided voltage of the voltage of the first terminal of the inductor L that is generated by the voltage divider circuit DVR, i.e. the voltage of the first terminal of the second voltage-dividing resistor Rv2) and the reference voltage Vref1 by a gain to output the error amplified signal EAOOV to the first input terminal such as the non-inverting input terminal of the buffer BUF or to the resistor R1 and the capacitor C1.

When the energy at the output terminal of the power converter of the present disclosure is released, the high-side switch HG of the power converter is turned on. At this time, the output current IL2 flows from the output terminal of the power converter sequentially through the inductor L, the high-side switch HG being turned on to the input power source Vin.

When the output current IL2 flows from the output terminal of the power converter sequentially through the inductor L and the high-side switch HG to the input power source Vin, the error amplifier ERR of the overvoltage protecting circuit OVP4 multiplies the difference between the voltage of the input power source Vin or the divided voltage thereof and the reference voltage Vref1 by the gain to output the error amplified signal EAOOV to the control terminal of the switch component MOV. When the voltage of the input power source Vin or the divided voltage thereof is too high, the voltage of the first terminal of the inductor L (or the divided voltage of the voltage of the first terminal of the inductor L that is the voltage of the first terminal of the second voltage-dividing resistor Rv2) is also too high. Under this condition, the switch component MOV is turned on by the error amplified signal EAOOV.

When the switch component MOV of the overvoltage protecting circuit OVP4 is turned on, the output current IL3 flows from the input power source Vin through the switch component MOV to the ground. At the same time, the output current IL2 flows from the output terminal of the power converter sequentially through the inductor L and the high-side switch HG to the input power source Vin. As a result, the energy at the output terminal of the power converter is released under the condition that the input power source Vin is not damaged by the excessive current from the power converter.

Figure 5:
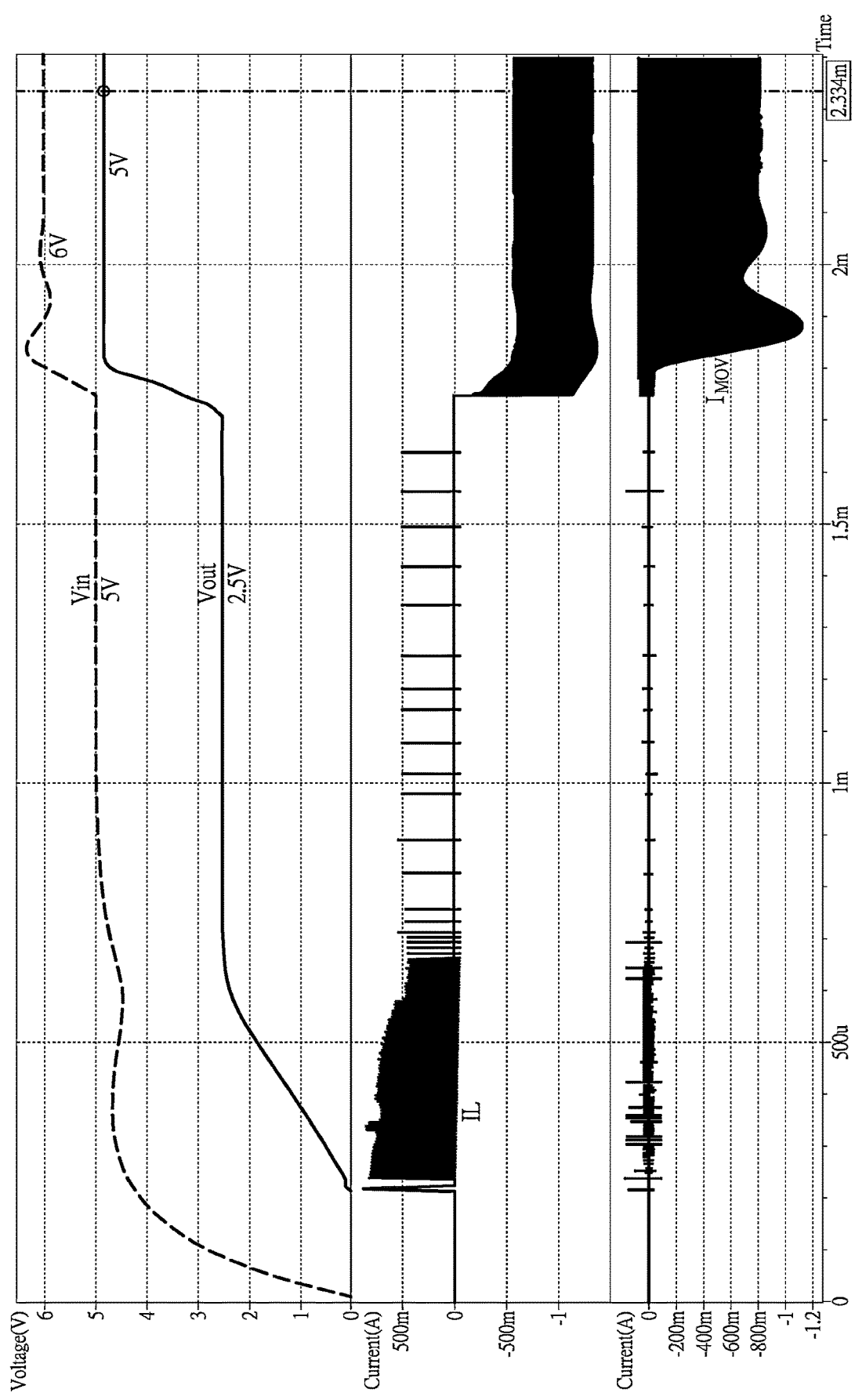
FIG. 5 is a waveform diagram of signals of the power converter having the overvoltage protection mechanism according to the fourth embodiment of the present disclosure.
Figure 6:
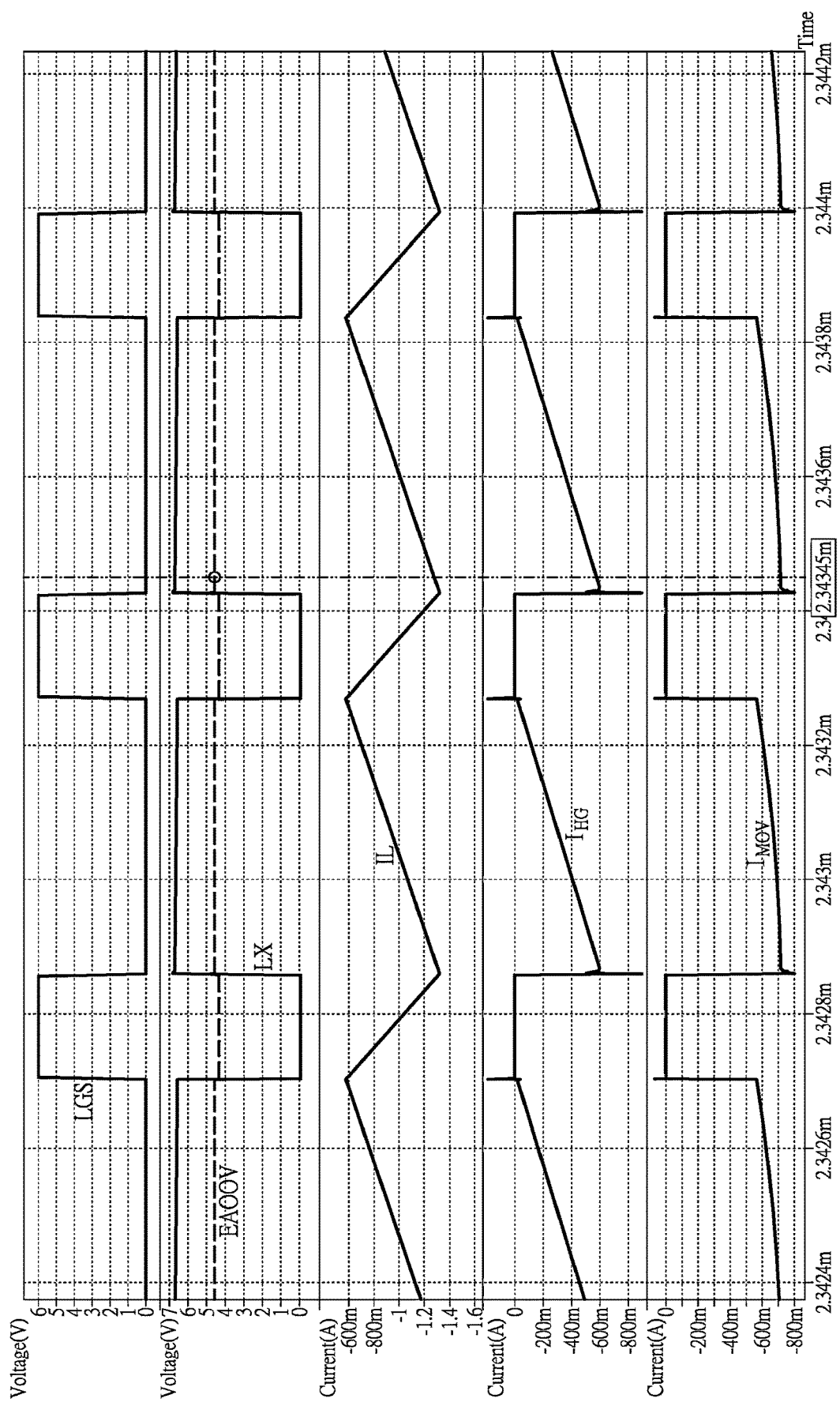
FIG. 6 is a waveform diagram of signals of the power converter having the overvoltage protection mechanism according to the fourth embodiment of the present disclosure.

Reference is made to FIGS. 5 to 6, in which FIG. 5 is a waveform diagram of signals of the power converter having the overvoltage protection mechanism according to the first to fourth embodiments of the present disclosure, and FIG. 6 is a waveform diagram of IHG & IMOV current signals of the power converter having the overvoltage protection mechanism according to the first to fourth embodiments of the present disclosure.

When the output voltage Vout of the output terminal of the power converter increases greatly in a short time as shown in FIG. 5 due to the excessive current supplied to the power converter by the external current source Iov or an external power source VS or other factors, the energy at the output terminal of the power converter must be released to prevent the circuit components of the power converter from being damaged by the excessive current.

When a low-side on-time signal LGS as shown in FIG. 6 is at a high level, the low-side switch LG as shown in FIGS. 1 to 4 is turned on and the high-side switch HG as shown in FIGS. 1 to 4 is turned off. Conversely, when the low-side on-time signal LGS is at a low level, the low-side switch LG is turned off and the high-side switch HG is turned on.

When the low-side on-time signal LGS is at the high level, the output current of the power converter sequentially through the inductor L and the low-side switch LG being turned on to the ground. As a result, an output current IL of the power converter is inverse such that a current from the output flowing through the inductor L discharges the output voltage Vout.

When the low-side on-time signal LGS is at the low level such that the low-side switch LG is turned off and the high-side switch HG is turned on, an output current IHG (that is the output current IL2 described above) of the power converter flows sequentially through the inductor L and the high-side switch HG, being turned on to the input power source Vin.

When the output current IHG flows from the output terminal of the power converter sequentially through the inductor L, the high-side switch HG being turned on to the input power source Vin, the error amplifier ERR of the overvoltage protecting circuit OVP4 multiplies a difference between the reference voltage Vref1 and a voltage of a node voltage signal of the note LX (that is the voltage of the first terminal of the inductor L) at the node LX between the second terminal of the high-side switch HG and the first terminal of the low-side switch LG by a gain to output the error amplified signal EAOOV to the control terminal of the switch component MOV.

When the voltage of the node voltage signal of the note LX (that is the voltage of the first terminal of the inductor L or the divided voltage thereof) is too high, the switch component MOV is turned on by the error amplified signal EAOOV. Under this condition, an output current $I_{MOV}$ (that is the output current IL3 described above) of the power converter flows through the switch component MOV of the overvoltage protecting circuit OVP4 to the ground. At the same time, the output current IHG (that is the output current IL2 described above) of the power converter flows sequentially through the inductor L and the high-side switch HG to the input power source Vin. As a result, the energy at the output terminal of the power converter is released under the condition that the input power source Vin is not damaged by the excessive current from the power converter.

In conclusion, the present disclosure provides the power converter having the overvoltage protection mechanism. When the energy at the output terminal of the power converter of the present disclosure is too high, the output current of the power converter of the present disclosure flows sequentially through the inductor, the high-side switch being turned on to the input power source connected to an input terminal of the power converter. At this time, if the output current of the power converter, the voltage of any one of the circuit components of the power converter or the current flowing through any one of the circuit components is larger than the threshold, the partial output current of the power converter of the present disclosure is released to the ground through the overvoltage protecting circuit of the power converter of the present disclosure. If necessary, the output current of the power converter of the present disclosure may flow sequentially through the inductor and the low-side switch to the ground. Therefore, the circuit components at the output terminal of the power converter of the present disclosure, the circuit components through which the released output current of the power converter flows and the input power source connected to the input terminal of the power converter can be prevented from being damaged by the excessive voltage or the excessive current from the power converter of the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power converter having an overvoltage protection mechanism, comprising:
   a switch circuit including a high-side switch and a low-side switch, wherein a first terminal of the high-side switch is connected to an input power source, a first terminal of the low-side switch is connected to a second terminal of the high-side switch, a second terminal of the low-side switch is grounded, a node between the second terminal of the high-side switch and the first terminal of the low-side switch is connected to a first terminal of an inductor, a second terminal of the inductor is connected to a first terminal of an output capacitor, and a second terminal of the output capacitor is grounded;
   a driver circuit connected to a control terminal of the high-side switch, a control terminal of the low-side switch and the input power source;
   a control circuit connected to the driver circuit and the input power source; and
   an overvoltage protecting circuit connected to the input power source and the first terminal of the inductor;
   wherein, when releasing energy at an output node between the second terminal of the inductor and the first terminal of an output capacitor, the control circuit controls the driver circuit to turn on the high-side switch, and an output current of the power converter flows from the output node sequentially through the inductor and the high-side switch to the input power source;
   wherein, when the overvoltage protecting circuit determines that a voltage or a current at the first terminal of the inductor or a voltage or a current of the input power source is larger than a threshold, a part of the output current of the power converter flows from the output node sequentially through the inductor and the high-side switch to the input power source, and other parts of the output current of the power converter flow from the output node through the overvoltage protecting circuit to a ground;
   wherein the overvoltage protecting circuit further includes a first transistor and a plurality of second transistors, a first terminal of one of the plurality of second transistors is connected to the input power source, a second terminal and a control terminal of the one of the plurality of second transistors are connected to a control terminal of the first transistor, a second terminal of another of the plurality of second transistors is grounded, a first terminal of the other of the plurality of second transistors is connected to a second terminal of the second transistor disposed adjacent thereto, and the control terminal and the second terminal of each of the plurality of second transistors are connected to each other.

2. The power converter according to claim 1, wherein, when releasing the energy at the output node between the second terminal of the inductor and the first terminal of the output capacitor, the driver circuit turns on the high-side switch such that the output current of the power converter flows from the output node sequentially through the inductor and the low-side switch to the ground.

3. The power converter according to claim 1, wherein the overvoltage protecting circuit further includes a resistor, the resistor is connected between the second terminal of the another of the plurality of second transistors and the ground, the second terminal of the another of the plurality of second transistors is connected to a first terminal of the resistor, and a second terminal of the resistor is grounded.

4. The power converter according to claim 1, further comprising:
   a comparator, wherein a first input terminal of the comparator is coupled to a reference voltage, a second input terminal of the comparator is connected to the second terminal of the inductor, and an output terminal of the comparator is connected to an input terminal of the control circuit.

5. The power converter according to claim 4, further comprising:
   a voltage divider circuit, wherein an input terminal of the voltage divider circuit is connected to the second terminal of the inductor, and an output terminal of the voltage divider circuit is connected to the second input terminal of the comparator.

6. The power converter according to claim 5, wherein the voltage divider circuit includes a first voltage-dividing resistor and a second voltage-dividing resistor, a first terminal of the first voltage-dividing resistor is connected to the second terminal of the inductor, a second terminal of the first voltage-dividing resistor is connected to a first terminal of the second voltage-dividing resistor, a node between the second terminal of the first voltage-dividing resistor and the first terminal of the second voltage-dividing resistor is connected to the second input terminal of the comparator, and a second terminal of the second voltage-dividing resistor is grounded.

7. The power converter according to claim 4, further comprising:
   a zero-crossing detector circuit connected to the output terminal of the comparator and the driver circuit, wherein the zero-crossing detector circuit detects a comparison signal outputted by the comparator to determine a time point at which the output current of the power converter reaches a zero value to output a zero-crossing signal, and the driver circuit drives the high-side switch and the low-side switch according to the zero-crossing signal.

8. A power converter having an overvoltage protection mechanism, comprising:
   a switch circuit including a high-side switch and a low-side switch, wherein a first terminal of the high-side switch is connected to an input power source, a first terminal of the low-side switch is connected to a second terminal of the high-side switch, a second terminal of the low-side switch is grounded, a node between the second terminal of the high-side switch and the first terminal of the low-side switch is connected to a first terminal of an inductor, a second terminal of the inductor is connected to a first terminal of an output capacitor, and a second terminal of the output capacitor is grounded;
   a driver circuit connected to a control terminal of the high-side switch, a control terminal of the low-side switch and the input power source;
   a control circuit connected to the driver circuit and the input power source; and
   an overvoltage protecting circuit connected to the input power source and the first terminal of an inductor;
   wherein, when releasing energy at an output node between the second terminal of the inductor and the first terminal of an output capacitor, the control circuit controls the driver circuit to turn on the high-side switch, and an output current of the power converter flows from the output node sequentially through the inductor and the high-side switch to the input power source;

wherein, when the overvoltage protecting circuit determines that a voltage or a current at the first terminal of the inductor or a voltage or a current of the input power source is larger than a threshold, a part of the output current of the power converter flows from the output node sequentially through the inductor and the high-side switch to the input power source, and other parts of the output current of the power converter flow from the output node through the overvoltage protecting circuit to a ground;

wherein the overvoltage protecting circuit further includes a first transistor and a second transistor, a first terminal of the second transistor is connected to the input power source, a second terminal of the second transistor is grounded, a control terminal of the second transistor is connected to a control terminal of the first transistor, a first terminal of the first transistor is connected to the first terminal of the inductor, and a second terminal of the first transistor is grounded.

9. The power converter according to claim 8, wherein the overvoltage protecting circuit further includes a resistor, the resistor is connected between the second terminal of the second transistor and the ground, the second terminal of the second transistor is connected to a first terminal of the resistor, and a second terminal of the resistor is grounded.

10. A power converter having an overvoltage protection mechanism, comprising:
a switch circuit including a high-side switch and a low-side switch, wherein a first terminal of the high-side switch is connected to an input power source, a first terminal of the low-side switch is connected to a second terminal of the high-side switch, a second terminal of the low-side switch is grounded, a node between the second terminal of the high-side switch and the first terminal of the low-side switch is connected to a first terminal of an inductor, a second terminal of the inductor is connected to a first terminal of an output capacitor, and a second terminal of the output capacitor is grounded;
a driver circuit connected to a control terminal of the high-side switch, a control terminal of the low-side switch and the input power source;
a control circuit connected to the driver circuit and the input power source; and
an overvoltage protecting circuit connected to the input power source and the first terminal of an inductor;
wherein, when releasing energy at an output node between the second terminal of the inductor and the first terminal of an output capacitor, the control circuit controls the driver circuit to turn on the high-side switch, and an output current of the power converter flows from the output node sequentially through the inductor and the high-side switch to the input power source;

wherein, when the overvoltage protecting circuit determines that a voltage or a current at the first terminal of the inductor or a voltage or a current of the input power source is larger than a threshold, a part of the output current of the power converter flows from the output node sequentially through the inductor and the high-side switch to the input power source, and other parts of the output current of the power converter flow from the output node through the overvoltage protecting circuit to a ground;

wherein the overvoltage protecting circuit includes an error amplifier and a switch component, a first input terminal of the error amplifier is coupled to the first terminal of the inductor, a second input terminal of the error amplifier is coupled to a reference voltage, an output terminal of the error amplifier is connected to a control terminal of the switch component, a first terminal of the switch component is connected to the input power source, and a second terminal of the switch component is grounded.

11. The power converter according to claim 10, wherein the overvoltage protecting circuit further includes a buffer, a first input terminal of the buffer is connected to the output terminal of the error amplifier, and a second input terminal of the buffer is connected to an output terminal of the buffer and the control terminal of the switch component.

12. The power converter according to claim 10, wherein the overvoltage protecting circuit further includes a voltage divider circuit, an input terminal of the voltage divider circuit is connected to the first terminal of the inductor, and an output terminal of the voltage divider circuit is connected to the first input terminal of the error amplifier.

13. The power converter according to claim 12, wherein the voltage divider circuit includes a first voltage-dividing resistor and a second voltage-dividing resistor, a first terminal of the first voltage-dividing resistor is connected to the first terminal of the inductor, a second terminal of the first voltage-dividing resistor is connected to a first terminal of the second voltage-dividing resistor, the first terminal of the second voltage-dividing resistor is connected to the first input terminal of the error amplifier, and a second terminal of the second voltage-dividing resistor is grounded.

14. The power converter according to claim 10, wherein the overvoltage protecting circuit further includes a resistor and a capacitor, a first terminal of the resistor is connected to the output terminal of the error amplifier, a second terminal of the resistor is connected to the first terminal of the capacitor, and the second terminal of the capacitor is grounded.

* * * * *